United States Patent [19]
Vinson

[11] Patent Number: 5,622,208
[45] Date of Patent: Apr. 22, 1997

[54] PORT PROTECTOR

[75] Inventor: Chris A. Vinson, Erie, Pa.

[73] Assignee: Polymer Molding, Inc., Erie, Pa.

[21] Appl. No.: 526,754

[22] Filed: Sep. 11, 1995

[51] Int. Cl.⁶ ........................................ F16L 55/10
[52] U.S. Cl. ............... 138/89; 138/96 R; 138/90
[58] Field of Search ............. 138/89, 90, 89.1–89.4, 138/96 R; 220/DIG. 19, 352, 306, 307, 294; 215/305, 295, 298, 363, 396, 398

[56] References Cited

U.S. PATENT DOCUMENTS

| | | | |
|---|---|---|---|
| 713,824 | 11/1902 | White, Jr. | 215/298 |
| 1,491,325 | 4/1924 | Thomas, Jr. | 138/89 X |
| 1,713,321 | 5/1929 | Becker | 215/298 |
| 1,757,438 | 5/1930 | Norwood | 215/298 |
| 2,829,794 | 4/1958 | Epps | 138/89 X |
| 2,977,973 | 4/1961 | Chakine | 138/89.3 X |
| 3,750,820 | 8/1973 | LaBarre | 215/296 X |
| 4,037,776 | 7/1977 | Meyers et al. | 215/298 X |
| 4,262,701 | 4/1981 | Beacom | 220/DIG. 19 X |
| 4,394,922 | 7/1983 | Wimmer | 215/305 X |
| 4,401,225 | 8/1983 | Schwaikert | 220/DIG. 19 X |
| 4,504,009 | 3/1985 | Boik et al. | 220/352 X |
| 4,583,654 | 4/1986 | Pufpaff et al. | 220/DIG. 19 X |
| 4,738,376 | 4/1988 | Markus | 220/352 |
| 5,005,721 | 4/1991 | Jordan | 220/DIG. 19 X |

FOREIGN PATENT DOCUMENTS

| | | | |
|---|---|---|---|
| 84901 | 5/1958 | Switzerland | 220/DIG. 19 |
| 339779 | 12/1930 | United Kingdom | 215/51 |
| 1457463 | 12/1976 | United Kingdom | 220/294 |

Primary Examiner—David Scherbel
Assistant Examiner—Patrick F. Brinson
Attorney, Agent, or Firm—Lovercheck and Lovercheck

[57] ABSTRACT

A plug for ports having a flexible handle to facilitate the removal of the plug from a port. A flange is integrally attached to an end of the plug body and extends radially outwardly from the body. One or more openings are formed in the flange which form handles concentric to the body. The openings have ends spaced from each other providing lands that attach the handles to the flange. The openings are spaced inward from the outer edges of the flange and the handles provided can be swung toward each other and grasped by a hand to pull the plug out of a port.

5 Claims, 1 Drawing Sheet

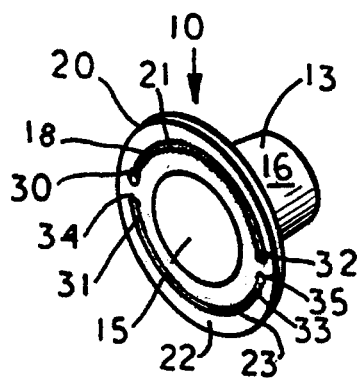
FIG. 1
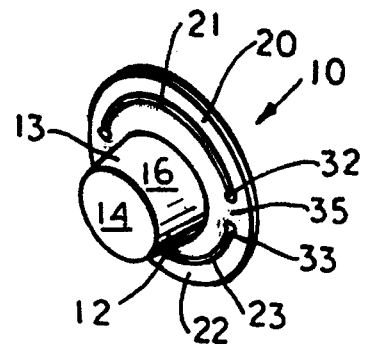
FIG. 2
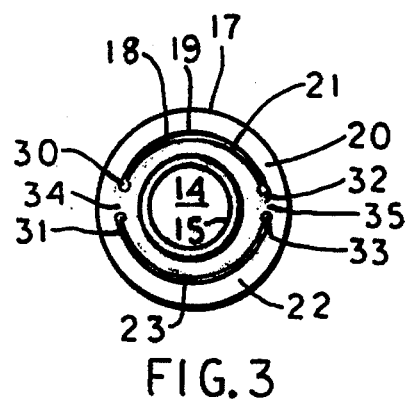
FIG. 3
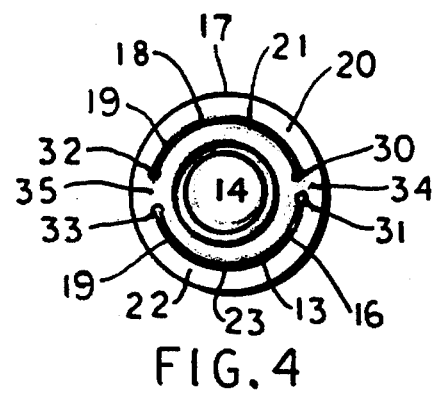
FIG. 4
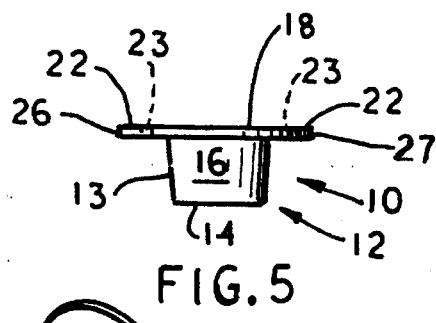
FIG. 5
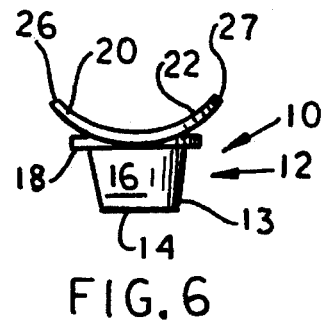
FIG. 6
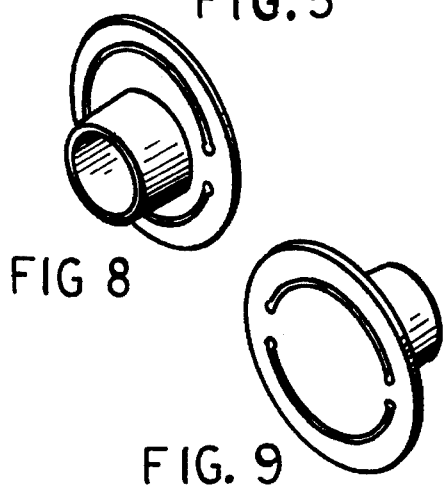
FIG. 8
FIG. 9
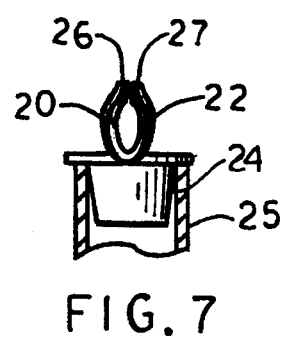
FIG. 7
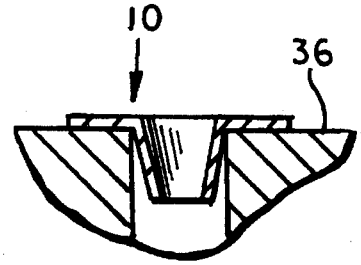
FIG. 10

PORT PROTECTOR

BACKGROUND OF THE INVENTION

This invention relates to closures and more particularly to plugs used to fill openings such as a port in a metal member. This type of plug typically has a lead in dimension smaller than the opening of the port. It then expands to a dimension slightly larger than the opening, thus creating a friction fit when the plug is inserted in the port. The plugs are particularly suited to the protection of ports in metal members during shipping and storage.

A long recognized problem in the use of such plugs is that they are difficult and time consuming to remove when the port is to be used or the metal member is to be placed in service. The prior art shows several efforts that have been made to provide a plug that will be simple, quick and easy to remove from the port.

Applicant is aware of the following U.S. Pat. No. : 117,402 to Gibson, et al; U.S. No. Pat. 492,012 to Hale; U.S. Pat. No. 1,370,170 to Ullman; U.S. Pat. No. 1,651,669 to Carpmael; U.S. Pat. No. 2,048,704 to Kraus; U.S. Pat. No. 2,277,713 to Parker; U.S. Pat. No. 3,104,681 to Gray, Jr.; U.S. Pat. No. 3,148,798 to Brown; U.S. Pat. No. 3,543,801 to Thayer, et al; U.S. Pat. No. 3,574,312 to Miller; U.S. Pat. No. 4,046,168 to Milne; U.S. Pat. No. 4,139,023 to Turley; and, U.S. Pat. No. 5,224,514 to Taylor.

SUMMARY OF THE INVENTION

The distinct advantage of this new opening plug is the added feature of one or more flexible handle members adjacent a first end of the plug. The handle members extend outwardly beyond the perimeter of the major plugging dimension. To remove the plug from an opening, it is only necessary to bend the handles upwardly together and then pull the plug out. This action distorts the plug partially disengaging the plug from the port wall, thus, alleviating the friction fit and side wall pressure, thus enabling the plug to be removed with much less resistance. None of the prior plugs provided the flexible handle which was easily gripped and bent upwardly by hand, and, when pulled, distorted the plug to reduce the force requirement to remove the plug from the port.

The plug may have a side wall generally conforming to the shape of the port. The body may be open or closed at each of the ends thereof.

It is an object of the present invention to provide an improved plug for an opening.

It is another object of the present invention to provide a port protector that is simple in construction, economical to manufacture and simple and efficient to use.

It is another object of the invention to provide a plug that is easily removed from the port when it is desired to do so.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

FIG. 1 is an isometric view of the first end of the plug showing the flexible handle member according to the invention.

FIG. 2 is an isometric view of the second end of the plug showing the flexible handle member from the opposite side.

FIG. 3 is a plan view of the first end of the plug shown with two handle members.

FIG. 4 is a plan view of the first end of the plug shown with two handle members.

FIG. 5 is a side view of the plug showing the flexible handle member at the first end thereof.

FIG. 6 is a view similar to FIG. 5 showing the flexible handles bent upwardly.

FIG. 7 is a view similar to FIG. 6 with the handles bent upwardly and touching at about their center points as they would be held to remove the plug, the plug being shown inserted in a pipe, the pipe being shown in cross section.

FIG. 8 is an isometric view similar to FIG. 2 showing the second end of the plug body open.

FIG. 9 is an isometric view similar to FIG. 1 showing the first end of the plug body closed.

FIG. 10 is a cross-sectional side view taken on line 10—10 of FIG. 5 of a metal member having a port and showing a plug inserted in the port according to the invention.

DESCRIPTION OF THE PREFERRED EMBODIMENT(S)

Now with more particular reference to the drawings, FIGS. 1 through 10, show plug 10 according to the invention. Plug 10 has body 12 which is made up of a first end 11, a second end 14 and a side wall 13. Side wall 13 is made of a size and shape to fit a port and to engage the port by friction fit to secure itself in place. First end 11 and second end 14 may be open or closed. Side wall 13 may be tapered from the top to the bottom and may be generally frustoconical in shape with inside surface 15 and outside surface 16.

First end 11 has flange 18 extending outwardly therefrom lying generally in a plane common to the plane of first end 11. Outwardly directed flange 18 is integrally attached to outside surface 16 at first end 11. Flange 18 has an inner periphery defined by first end 11 and an outer periphery defined by flange outer edge 19.

As shown in FIG. 4, first handle 20 extends generally outwardly from flange 18 and is integrally connected thereto at lands 34, 35. First handle 20 is separated from flange 18 by first opening 21. Opening 21 may be generally arcuate in shape and extend generally around a portion of flange 18 generally concentric thereto. The ends of first opening 21 may be formed by circular holes 30, 32. Circular holes 30, 32 provide stress relief to handle 20 so that handle 20 will resist tearing when pulled to remove plug 10 from port 24 in metal member 25.

As shown in FIG. 3, second handle 32 extends generally outwardly from flange 18 and is integrally connected thereto at lands 34, 35. Second handle 22 is separated from flange 18 by second opening 23. Second opening 23 may be generally arcuate in shape and extend generally around a portion of flange 18 generally concentric thereto. The ends of second opening 23 may be formed by circular holes 31, 33. Circular holes 31, 33 provide stress relief to handle 22 so that handle 22 will resist tearing when pulled to remove plug 10 from port 24.

Land 35 is a portion of flange 18 extending between end 32 and end 33. Land 34 is a portion of flange 18 extending between end 32 and end 33. Lands 34, 35 provide an integral connection between handles 20, 22 and flange 18.

When plug 10 is inserted in pipe 25 handles 20, 22 can be grasped by the operator and swung upwardly as shown in FIGS. 6 and 7. The operator can then use handles 20, 22 to pull plug 10 out of pipe 25. When grasped by the operator, first handle center 26 and second handle center 27 are swung upwardly and touch at about the midpoint of plug 10. When swung upwardly center 26 of first handle 20 will contact center 27 of second handle 22 and when thus pushed together handles 20, 22 provide a secure grip to enable the quick and easy removal of plug 10 by the operator.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A plug adapted to fill a port;

said plug having a one piece body, a flange and a first handle each made of relatively thin flexible material;

said body tapering from a larger first end to a smaller second end said second end being closed;

said flange being integrally attached to said body at said first end;

said handle being integrally attached to and outwardly extending from said flange;

said handle being defined by a first arcuate opening extending entirely through said flange;

said arcuate opening being concentric to said body;

said first flexible handle being adapted to be bent upwardly to a position extending generally across said first end of said one piece body whereby said first flexible handle may be grasped by a hand to pull said plug out of said port.

2. The plug recited in claim 1 wherein said plug further comprise a second flexible handle integrally attached to and outwardly extending from said flange;

said second flexible handle being defined by a second arcuate opening in said flange;

said second opening being spaced from said body and being concentric to said body;

said second flexible handle being adapted to be bent upwardly, to a position extending generally across the first end of said plug whereby said second flexible handle may be grasped by a hand to pull said closure out of said opening.

3. The plug recited in claim 1 wherein said first opening has a first end and a second end and terminates at each of said ends with an enlarged arcuate space whereby stress relief is provided to prevent tearing of said first flexible handle.

4. The plug recited in claim 2 wherein a first land integrally connects said first flexible handle, said second flexible handle and said flange.

5. The plug recited in claim 4 wherein a second land integrally connects said first flexible handle, said second flexible handle and said flange.

* * * * *